US012749132B2

(12) United States Patent
Imafuku

(10) Patent No.: US 12,749,132 B2
(45) Date of Patent: Sep. 29, 2026

(54) INFORMATION PROCESSING DEVICE

(71) Applicant: Realize Company Inc., Tokyo (JP)

(72) Inventor: Yosuke Imafuku, Tokyo (JP)

(73) Assignee: Realize Company Inc., Tokyo (JP)

( * ) Notice: Subject to any disclaimer, the term of this patent is extended or adjusted under 35 U.S.C. 154(b) by 474 days.

(21) Appl. No.: 18/549,453

(22) PCT Filed: Feb. 24, 2022

(86) PCT No.: PCT/JP2022/007660
§ 371 (c)(1),
(2) Date: Sep. 7, 2023

(87) PCT Pub. No.: WO2022/190883
PCT Pub. Date: Sep. 15, 2022

(65) Prior Publication Data
US 2024/0303755 A1 Sep. 12, 2024

(30) Foreign Application Priority Data
Mar. 8, 2021 (JP) ................................ 2021-036455

(51) Int. Cl.
*G06Q 50/12* (2012.01)
*G06Q 30/0283* (2023.01)

(52) U.S. Cl.
CPC ......... *G06Q 50/12* (2013.01); *G06Q 30/0284* (2013.01)

(58) Field of Classification Search
CPC .......................... G06Q 50/12; G06Q 30/0284
(Continued)

(56) References Cited

U.S. PATENT DOCUMENTS

2006/0011417 A1* 1/2006 Chen ...................... A47F 10/06 186/39
2021/0396730 A1* 12/2021 Zhang .................... G01N 33/12
(Continued)

FOREIGN PATENT DOCUMENTS

CN 112434550 A 3/2021
JP H10-063927 A 3/1998
(Continued)

OTHER PUBLICATIONS

"Development of an RFID-based sushi management system: The case of a conveyor-belt sushi restaurant" Published by Elsevier (Year: 2008).*
(Continued)

*Primary Examiner* — Zeina Elchanti
(74) *Attorney, Agent, or Firm* — Osha Bergman Watanabe & Burton LLP

(57) ABSTRACT

The disclosure may address the problem of providing food and beverages at an appropriate price in accordance with the quality. A circulation count detection unit may detect the number of times a sushi dish has circulated on a conveyor from data obtained by a detection sensor. A price calculation unit may calculate the price of sushi placed on the sushi dish in accordance with the number of circulations of the sushi dish as detected by the circulation count detection unit. A container format conversion unit may execute a control for converting the format of the sushi dish in accordance with the price of the sushi changed by the price calculation unit. Thus, a consumer may be able to purchase sushi easily at an appropriate price in accordance with the quality.

5 Claims, 4 Drawing Sheets

(58) Field of Classification Search
USPC .......................................................... 705/7.35
See application file for complete search history.

(56) References Cited

U.S. PATENT DOCUMENTS

| | | | | |
|---|---|---|---|---|
| 2022/0292827 | A1* | 9/2022 | Chen | G06F 16/786 |
| 2023/0206186 | A1* | 6/2023 | Kakimoto | A47B 77/08<br>705/1.1 |

FOREIGN PATENT DOCUMENTS

| | | | | |
|---|---|---|---|---|
| JP | 2002017546 | A | | 1/2002 |
| JP | 2003016537 | A | * | 1/2003 |
| JP | 2007044059 | A | | 2/2007 |
| JP | 2007-172445 | A | | 7/2007 |
| JP | 2007175276 | A | | 7/2007 |
| JP | 2008-017902 | A | | 1/2008 |
| JP | 2008198024 | A | * | 8/2008 |
| JP | 2008247444 | A | | 10/2008 |
| JP | 2013-066607 | A | | 4/2013 |
| JP | 2017-117333 | A | | 6/2017 |

OTHER PUBLICATIONS

Extended European Search Report issued in European Application No. 22766842.3, dated Jan. 2, 2024 (8 pages).
Office Action issued in Korean Application No. 10-2023-7033313; Dated Jan. 31, 2024 (9 pages).
International Search Report issued in PCT/JP2022/007660 on Apr. 26, 2022 (5 pages).
Written Opinion of the International Searching Authority issued in PCT/JP2022/007660 on Apr. 26, 2022 (4 pages).
Office Action issued in Chinese Application No. 202280019919.8, mailed Jun. 1, 2024 (13 pages).
Office Action issued in counterpart Japanese Patent Application No. 2022-150257 mailed on Jan. 7, 2025 (7 pages).

* cited by examiner

INFORMATION PROCESSING DEVICE

TECHNICAL FIELD

The present invention relates to an information processing device.

BACKGROUND ART

A system for conveying plates of sushi on a circulating sushi feeding conveyor belt to provide the sushi to customers has been widely used (see, e.g., Patent Document 1).

CITATION LIST

Patent Document

Patent Document 1: Japanese Unexamined Patent Application, Publication No. H10-63927

DISCLOSURE OF THE INVENTION

Problems to be Solved by the Invention

Food and drink including sushi inevitably loose freshness over time. In particular, it is difficult for the customers to know how long it has been since the food or drink going around on a system for continuously circulating the food or drink, such as the system of Patent Document 1, was prepared. The customers tend to place a new order instead of taking the circulating food or drink because they prefer to get fresher and higher quality food or drink for the same amount of money. This results in large amounts of food waste.

Under these circumstances, the present invention has been achieved to provide food or drink at a fair price according to quality.

Means for Solving the Problems

To achieve the object described above, an aspect of the present invention is directed to:

an information processing device for assisting a service of providing food or drink on or in a container carried on a conveyor forming a closed loop to a customer around the conveyor, the information processing device including:

a lap count detector that detects a lap count which is the number of times the container has travelled around the conveyor;

a price changer that changes a price of the food or drink on or in the container according to the lap count of the container; and a container appearance changer that changes an appearance of the container according to the price changed according to the lap count.

Effects of the Invention

The present invention allows food or drink to be provided at a fair price according to quality.

PREFERRED MODE FOR CARRYING OUT THE INVENTION

Embodiments of the present invention will be described below with reference to the drawings.

Figure 1:
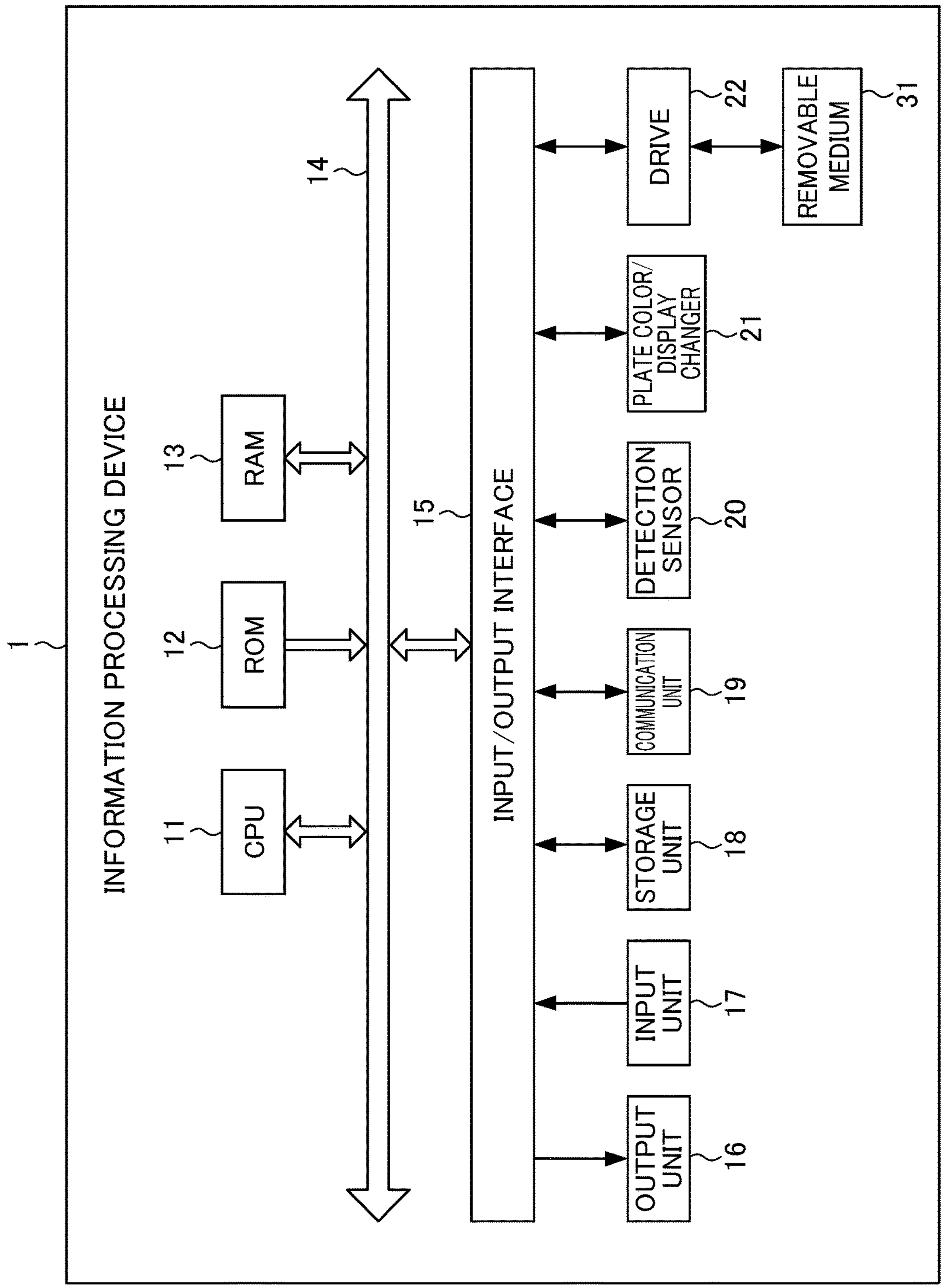
FIG. 1 is a block diagram illustrating a hardware configuration of an information processing device of an embodiment of the present invention.

FIG. 1 is a block diagram illustrating a hardware configuration of an information processing device of an embodiment of the present invention.

Prior to the description of the embodiment of the present invention, service to which the information processing device of the embodiment of the present invention is applied (will be hereinafter referred to as "target service") will be briefly described first. The target service is provided to customers who take food or drink such as sushi in a shop, for example, a conveyor belt sushi restaurant, and allows the customers to have sushi at a fair price according to its quality.

The target service uses an information processing device 1 having the function of detecting the states of sushi and a sushi plate, the function of changing the price of food or drink such as sushi according to the detected states, and the function of changing the appearance of the sushi plate according to the price of the sushi. The information processing device 1 is provided by a system administrator not shown in the drawings and is placed in, for example, a conveyor belt sushi restaurant.

The information processing device 1 includes a central processing unit (CPU) 11, read only memory (ROM) 12, random access memory (RAM) 13, a bus 14, an input/output interface 15, an output unit 16, an input unit 17, a storage unit 18, a communication unit 19, a detection sensor 20, a plate color/display changer 21, and a drive 22.

The CPU 11 performs various processes in accordance with a program stored in the ROM 12 or a program loaded from the storage unit 18 into the RAM 13. The RAM 13 appropriately stores data that the CPU 11 requires to perform the processes.

The CPU 11, the ROM 12, and the RAM 13 are mutually connected via the bus 14. The input/output interface 15 is also connected to the bus 14. The input/output interface 15 is connected to the output unit 16, the input unit 17, the storage unit 18, the communication unit 19, the detection sensor 20, the plate color/display changer 21, and the drive 22.

The output unit 16 comprises a liquid crystal display of any type and outputs various pieces of information. The input unit 17 comprises hardware of any type and inputs various pieces of information. The storage unit 18 comprises a component such as a hard disk or dynamic random access memory (DRAM) and stores various types of data. The communication unit 19 controls communication with other devices via a network N including the Internet. The detection sensor 20 comprises, for example, a camera, and is placed at a predetermined position such as on the ceiling or wall of a conveyor belt sushi restaurant. A camera as the detection sensor 20 takes an image of a sushi plate placed on a chain conveyor (e.g., a conveyor V shown in FIG. 2) when the sushi plate passes a predetermined position. Specifically, the camera takes an image of the sushi plate every time the continuously travelling sushi plate circles the chain conveyor. The plate color/display changer 21 comprises, for example, a device capable of changing a color tone of the sushi plate. Specifically, the plate color/display changer 21 changes the color of the sushi plate to a predetermined color by applying a predetermined voltage to an electrode of the sushi plate made of glass containing a predetermined chemical substance (e.g., electrochromic glass).

A removable medium 31, such as a magnetic disk, an optical disk, a magneto-optical disk, or semiconductor memory, is suitably put in the drive 22. A program read from the removable medium 31 by the drive 22 is installed in the storage unit 18 as needed. The removable medium 30 can also store various data stored in the storage unit 18, just like the storage unit 18.

Figure 2:
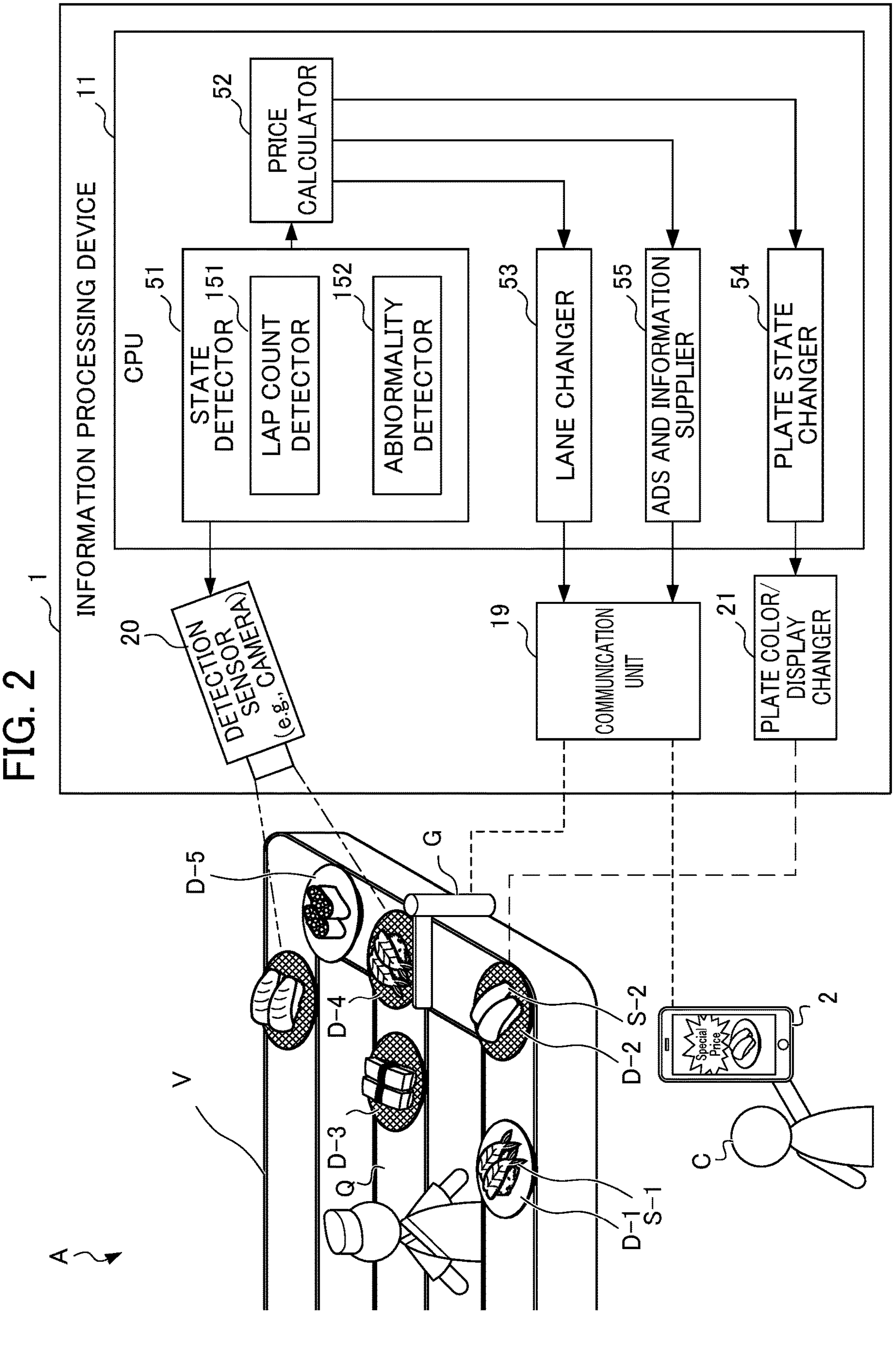
FIG. 2 is a view illustrating an installation example of equipment used for the service and a functional block diagram illustrating an example of a functional configuration of the information processing device shown in FIG. 1.

FIG. 2 is a view illustrating an installation example of equipment used for the target service and a functional block diagram illustrating an example of the functional configuration of the information processing device shown in FIG. 1.

In the example shown in FIG. 2, a conveyor V circulating and carrying sushi plates D with sushi S is placed in a shop A. When a customer C around the conveyor V takes the sushi plate D going around the conveyor V, the sushi plate D is provided to the customer C.

The CPU 11 of the information processing device 1 includes functional components, i.e., a state detector 51, a price calculator 52, a lane changer 53, a container appearance changer 54, and an ads and information supplier 55.

The state detector 51 includes a lap count detector 151 and an abnormality detector 152 and detects the states of m sushi plates D-1 to D-m (m is any integer not less than one) travelling on the conveyor V forming a closed loop and the states of pieces of sushi S-1 to S-n (n is any integer not less than one) on the sushi plates D-1 to D-m. The sushi plates D-1 to D-m will be collectively referred to as a "sushi plate D" when it is not particularly necessary to distinguish them. The pieces of sushi S-1 to S-m will also be collectively referred to as "sushi S" when it is not particularly necessary to distinguish them. For convenience of explanation, unless otherwise specified, the following description will be made on the premise that the sushi S is served on the sushi plate D.

The lap count detector 151 detects the number of times the sushi plate D has circled the conveyor V (will be hereinafter referred to as a "lap count") from the image of the sushi plate D taken by the camera which is an example of the detection sensor 20. Specifically, for example, the lap count detector 151 detects that the sushi plate D-1 has circled the conveyor V twice, or the sushi plate D-2 has circled the conveyor V five times, using a predetermined image recognition technology. Note that the camera placed in the shop as the detection sensor 20 is merely an example, and the detection sensor is not limited to the camera. For example, various sensors such as a weight sensor, a temperature sensor, and a sensor using infrared rays may be placed. Two or more of these sensors including the camera may be placed on the conveyor V. The lap count of the sushi plate D travelling on the conveyor V is automatically detected in this way, allowing quantification of the amount of time passed since the sushi plate D was placed on the conveyor V.

The abnormality detector 152 detects abnormality of the sushi S from the image of the sushi plate D taken by the camera which is an example of the detection sensor 20. Possible examples of the abnormality of the sushi S include that the sushi S is not neatly served on the sushi plate D, a topping of the sushi S has fallen off the rice, and the sushi S has dried. For example, the abnormality detector 152 may detect that the topping of the sushi S has changed in color by performing predetermined image processing based on the captured image of the sushi plate D. When the sushi S contains a mackerel topping, and the topping has turned blackish, the sushi S may be determined to be abnormal (less fresh). The abnormality of the sushi S automatically detected in this way can be used as one of indices of the quality of the sushi S.

The price calculator 52 calculates the price of the sushi S on the sushi plate D according to the lap count of the sushi plate D detected by the lap count detector 151. Specifically, when the price of tuna sushi S is initially 500 yen, the price calculator 52 changes the price based on a predetermined calculation formula according to the lap count, for example, to 300 yen when the sushi S has made three laps around the conveyor V, to 100 yen when the sushi S has made five laps around the conveyor V, and to zero yen when the sushi S has made five or more laps around the conveyor V. For example, when the sushi S contains a mackerel topping which loses its freshness relatively easily, the price calculator 52 may change the price, which is initially 300 yen, to 100 yen when the sushi S has made a single lap around the conveyor V, and to zero yen when the sushi S has made five or more laps around the conveyor V. The price of the sushi is changed according to the lap count of the sushi plate D, allowing the customer C to take the sushi S at a fair price according to the quality.

The price calculator 52 may change the price of the sushi according to whether the sushi S is detected to be abnormal by the abnormality detector 152. Specifically, for example, the price of the tuna sushi S is reduced to 300 yen when the sushi plate D has made four laps on the conveyor V in the above case. However, the price of the sushi S may be changed to zero yen although the lap count is four if the abnormality detector 152 detects that the color of the topping of the sushi S has changed. Thus, the lap count of the sushi plate D and how the sushi S looks are reflected in the price, allowing the customer C to eat the sushi S at a fair price according to the quality. This allows the customer C to have many pieces of less expensive sushi S or only a few pieces of expensive sushi S. Thus, the customer C can enjoy the conveyor belt sushi as the customer wishes according to the budget or condition. Such a variety of ways of enjoying the conveyor belt sushi reduces the number of sushi plates D that nobody takes and keep going around the conveyor, and thus, contributes to the reduction of food waste.

The container appearance changer 54 performs control to change the appearance of the sushi plate D according to the price of the sushi S changed by the price calculator 52. Specifically, for example, when the sushi plate D-1 carrying the sushi S-1, which is 100 yen, passes a predetermined position, the container appearance changer 54 performs control to change the color of the sushi plate D-1 from white to blue using the plate color/display changer 21. Alternatively, for example, when the sushi plate D-2 carrying the sushi S-2, which is 300 yen, passes a predetermined position, the container appearance changer 54 performs control to change the color of the sushi plate D-2 from blue to yellow. Thus, the customer C can easily tell that the price of the sushi S on the sushi plate D has changed and can have the sushi S after understanding the quality and the price.

Based on the price of the sushi S, the lane changer 53 performs control to operate a path diverter G provided for the conveyor V so that the sushi plate D leaves the closed-loop conveyor V. Specifically, for example, the lane changer 53 outputs a signal instructing the path diverter G to close via the communication unit 19 when sushi of each of the sushi plates D-3 and D-4 with the prices reduced to 50 yen are brought close to the path diverter G. Thus, as shown in FIG. 2, the sushi plates D-3 and D-4 leave the closed-loop conveyor V and move to a diversion lane Q for a predetermined process such as disposal. Then, when sushi of a sushi plate D-5 which is 300 yen comes close to the path diverter G, the lane changer 53 outputs a signal to instruct the path diverter G to open via the communication unit 19. Thus, the sushi plate D-5 goes around the closed-loop conveyor V as shown in FIG. 2. In summary, when the price of the sushi S falls below a predetermined threshold, the lane changer 53 causes the sushi S to leave the lane so that the sushi S is removed and not supplied to the customer C. This can keep the customer from buying only the pieces of less expensive sushi S with a low profit rate, allowing the shop A to keep a certain profit rate.

The ads and information supplier 55 performs control to transmit predetermined information to a terminal 2 owned by the customer C via the communication unit 19 when the price of the sushi S changed by the price calculator 52 meets a predetermined condition. Specifically, for example, when the price of the sushi S-2 is changed to 100 yen by the price calculator 52, the ads and information supplier 55 performs control to transmit sale information such as "Take five 100 yen sushi, get one free" to the terminal 2. Supplying such information encourages the customer to consume more pieces of sushi S on the conveyor V. This can increase sales of the shop A and reduce food waste.

Figure 3:
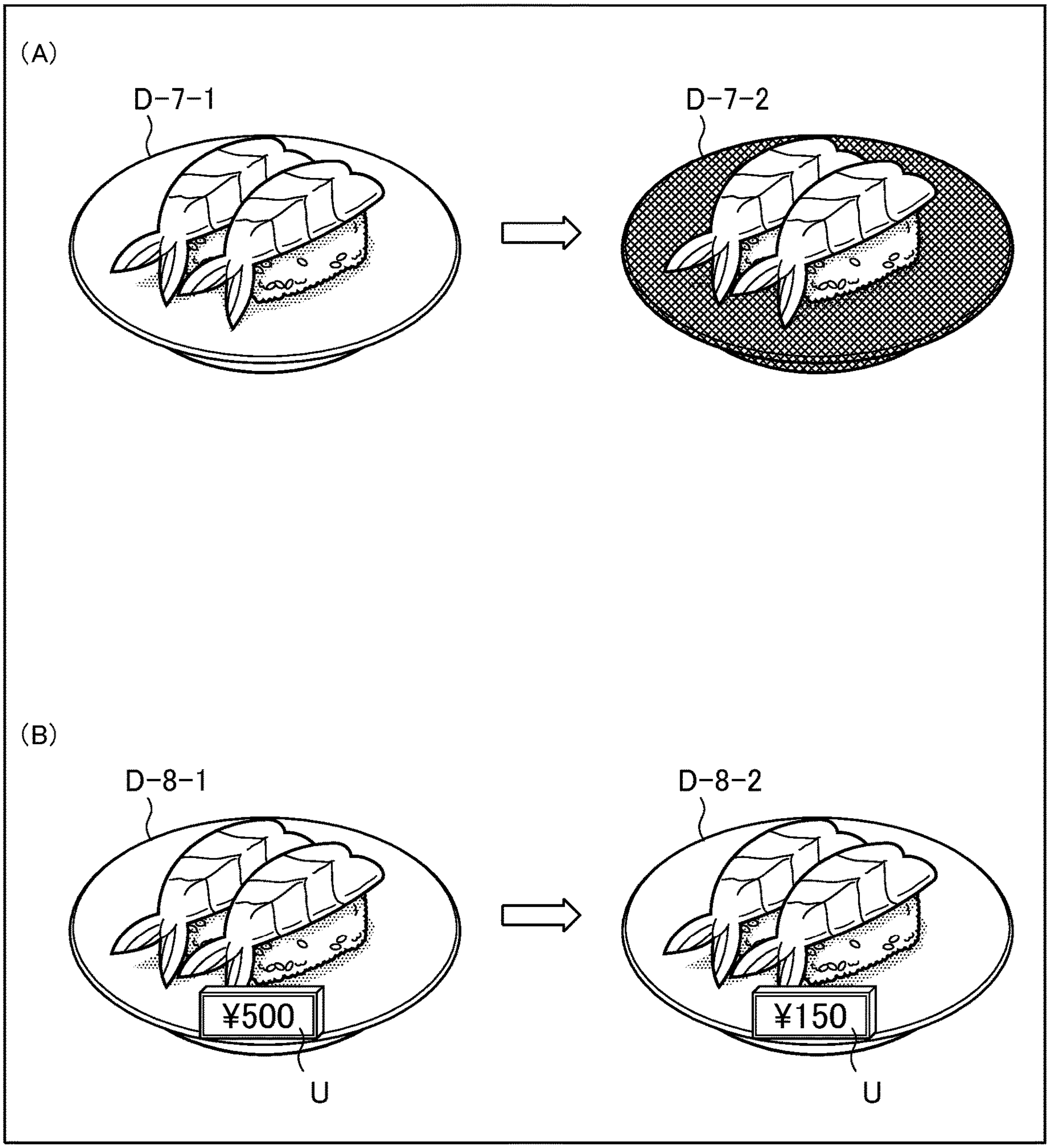
FIG. 3 is views illustrating examples of how the appearance of a plate is changed.

FIG. 3 shows examples of how the appearance of the sushi plate D is changed.

FIG. 3(A) shows an example in which the color of the sushi plate D is changed according to the price of the sushi S changed by the price calculator 52. Specifically, for example, sushi S-7-1 on a sushi plate D-7-1 before being carried is 500 yen, and the color of the sushi plate D-7-1 is blue. The sushi plate D-7-1 is made of an electrochromic material and changes color when a predetermined voltage is applied to the plate. For example, when the price of the sushi S-7-1 is reduced to 300 yen after the plate has made three laps, the predetermined voltage is applied to an electrode (not shown) of the sushi plate D-7-1 to change the color of the sushi plate D-7-1 from blue to yellow (see a sushi plate D-7-2 shown in FIG. 3(A)).

FIG. 3(B) shows an example in which the contents shown on a display screen U of the sushi plate D is changed according to the price of the sushi S changed by the price calculator 52. Specifically, for example, when sushi S-8-1 on a sushi plate D-8-1 before being carried is 500 yen, the price "500 yen" is shown on the display screen U. When the price of the sushi S-8-1 is reduced to 300 yen after the sushi plate D-8-1 has made three laps, the price "300 yen" is shown on the display screen U (see a sushi plate D-8-2 shown in FIG. 3(B)). The appearance of the plate is changed according to the price of the sushi S, allowing the customer C to easily tell at a glance that the price of the sushi S has changed. Thus, for example, the customer C can take the desired sushi plate D efficiently.

Figure 4:
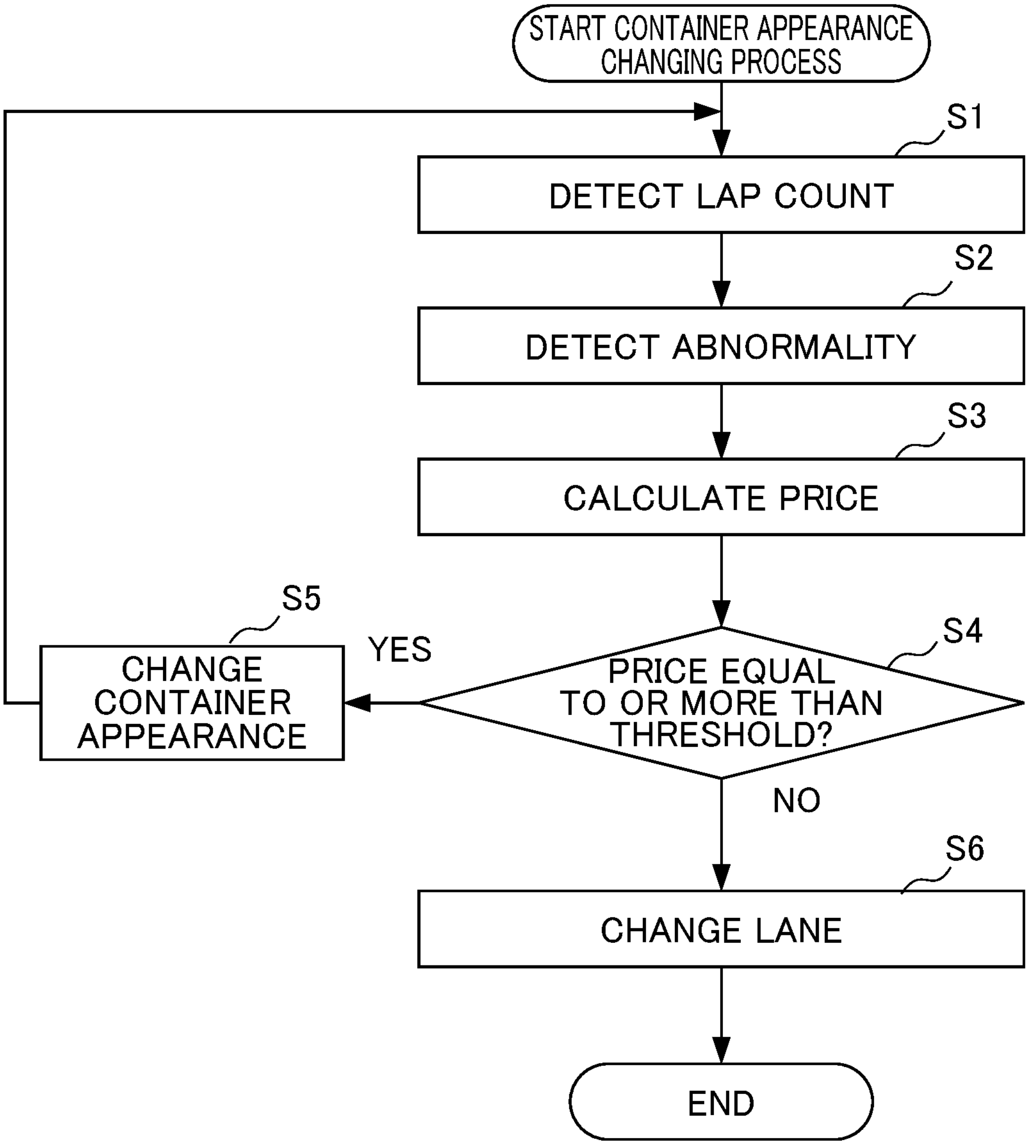
FIG. 4 is a flowchart of a container appearance changing process performed by the information processing device having the functional configuration shown in FIG. 2.

Referring to FIG. 4, a container appearance changing process performed by the information processing device 1 having the functional configuration of FIG. 2 will be described below.

FIG. 4 is a flowchart illustrating the container appearance changing process performed by the information processing device having the functional configuration of FIG. 2.

In Step S1, the lap count detector 151 detects the lap count of the sushi plate D using the detection sensor 20. In Step S2, the abnormality detector 152 detects whether the sushi S is abnormal. In Step S3, the price calculator 52 changes the price of the sushi S according to the lap count of the sushi plate D. The price calculator 52 may change the price of the sushi S according to whether the sushi S is abnormal or not. In Step S4, the price calculator 52 determines whether the price of the sushi S changed in Step S3 is equal to or more than a threshold.

If the price of the sushi S is determined to be equal to or more than the threshold in Step S4, the process proceeds to Step S5. In Step S5, the container appearance changer 54 performs control to change the appearance of the sushi plate D according to the price of the sushi S changed by the price calculator 52. Then, the process returns to Step S1, and the subsequent steps are repeated.

If the price of the sushi S is not determined to be equal to or more than the predetermined value in Step S4, Step S5 is skipped, and the process proceeds to Step S6.

In Step S6, the lane changer 53 outputs a signal instructing the path diverter G on the conveyor V to close so that the sushi S which is cheaper than the predetermined price leaves the closed-loop conveyor V. Then, the container appearance changing process ends.

The embodiment of the present invention has just been described above, but the present invention is not limited to the embodiment and may be modified or improved to the extent that the purpose of the invention can be achieved.

For example, the conveyor V may have an ultraviolet irradiation device. When the sushi plate D passes a predetermined position on the conveyor V, the ultraviolet irradiation device irradiates the sushi plate D with ultraviolet light to remove viruses that adhere to the sushi plate D and the sushi S.

The series of processes described above may be performed by hardware or software. That is, the functional configuration shown in FIG. 2 is merely an example and does not limit the present invention. Specifically, it is sufficient for the system to have the function that can achieve the series of processes described above, and the functional blocks used to achieve the function are not particularly limited to the examples shown in FIG. 2. The locations of the functional blocks and the database are not particularly limited to the examples shown in FIG. 2 and may be determined as appropriate. A single functional block may comprise hardware alone, software alone, or a combination of the hardware and the software.

When the software is used to perform the series of processes, for example, programs constituting the software are installed in a computer via a network or a storage medium. The computer may be installed in exclusive hardware. Alternatively, the computer may be a computer with various programs installed to achieve various functions, for example, a general-purpose smartphone or personal computer.

For example, a storage medium including such programs comprises not only a removable medium which is not shown and is distributed to a user (a provider of the target service) separately from the main device to provide the program, but also a storage medium installed in advance in the main device and provided to the user.

The step of writing the program in the storage medium include processes performed chronologically in order, and also include processes that are not necessarily performed chronologically in order, but performed in parallel or individually. In this specification, the term "system" designates an entire apparatus including multiple devices and multiple instruments.

In other words, it is sufficient for the information processing device of the present invention to have the following configuration, and the information processing device can be achieved in the form of various embodiments.

Specifically, the information processing device of the present invention is

- an information processing device (e.g., the information processing device 1 in FIG. 2) for assisting a service of providing food or drink (e.g., the sushi S in FIG. 2) on or in a container (e.g., the sushi plate D in FIG. 2) carried on a conveyor (e.g., the conveyor V in FIG. 2) forming a closed loop to a customer around the conveyor (e.g., the customer C in FIG. 2). The information processing device includes:
- a lap count detector (e.g., the lap count detector 151 in FIG. 2) that detects a lap count which is the number of times the container has travelled around the conveyor;
- a price changer (e.g., the price calculator 52 in FIG. 2) that changes the price of the food or drink on or in the container according to the lap count of the container; and
- a container appearance changer (e.g., the container appearance changer 54 in FIG. 2) that changes the appearance of the container according to the price changed according to the lap count. This allows the customer to easily tell at a glance that the price of the food or drink carried on the conveyor has changed, and the customer can have the food or drink at a fair price according to the quality of the food or drink.

The information processing device of the present invention further includes a supplier (e.g., the ads and information supplier 55) that supplies predetermined information (e.g., sale information) to the customer when the price changed according to the lap count meets a predetermined condition (e.g., when the price is changed to 300 yen or lower). This motivates the customer to buy more and boosts the consumption of the sushi S, leading to less food waste.

The conveyor (e.g., the conveyor V in FIG. 2) of the information processing device of the present invention includes a diversion path (e.g., the path diverter G) that allows the container to leave the closed loop. The information processing device further includes a diverter (e.g., the lane changer 53 in FIG. 2) that allows the container (e.g., the sushi plate D in FIG. 2) with the price lower than a predetermined threshold (e.g., reduced to zero yen) to move to the diversion path. This can prevent the customer from having only the pieces of food or drink which are zero yen, for example, and the shop that provides the food or drink can maintain a certain profit rate.

The information processing device of the present invention further includes a state detector that detects the state of the container and the state of the food or drink on or in the container. This allows the food or drink to be provided at a fair price according to the quality of the food or drink, such as appearance.

EXPLANATION OF REFERENCE NUMERALS

1: Information processing device, 51: State detector, 52: Price calculator, 53: Lane changer, 54: Container appearance changer, 55: Ads and information supplier, 151: Lap count detector, 152: Abnormality detector

The invention claimed is:

1. An information processing device comprising:

a lap count detector that detects a lap count, wherein the lap count corresponds to a number of times a container has travelled around a conveyor, wherein the conveyor forms a closed loop for a customer, and wherein the conveyor includes a diversion path that allows the container to leave the closed loop;

an abnormality detector that automatically detects an abnormality in food or drink that is provided by the container, wherein the abnormality is used as an indicator of one or more qualities of the food or the drink on or in the container;

a price calculator that changes a price of the food or the drink on or in the container according to the lap count of the container by the lap count detector and a detection of the abnormality of the food or the drink by the abnormality detector;

a container appearance changer that changes an appearance of the container according to the price changed; and a diverter that moves the container to the diversion path in response to the diverter determining that the price of the food or the drink is less than a predetermined threshold.

2. The information processing device according to claim 1, further comprising: an information supplier that supplies predetermined information to the customer in response to the price being changed, according to the lap count and the abnormality that is detected in the food or the drink, and meeting a predetermined condition.

3. The information processing device according to claim 1, further comprising a state detector that comprises the lap count detector and the abnormality detector, wherein the state detector detects a state of the container and a state of the food or the drink on or in the container.

4. The information processing device according to claim 1, further comprising: a state detector that detects a state of the container and a state of the food or drink on or in the container.

5. The information processing device according to claim 1, further comprising a computer and a camera that captures an image of the food or drink at a predetermined position within the closed loop of the conveyor, wherein the abnormality is determined by the computer using the abnormality detector and the image.

* * * * *